United States Patent
Ohashi et al.

(10) Patent No.: US 10,962,061 B2
(45) Date of Patent: Mar. 30, 2021

(54) METHOD FOR MANUFACTURING HUB UNIT

(71) Applicant: JTEKT CORPORATION, Osaka (JP)

(72) Inventors: Atsushi Ohashi, Sakai (JP); Hiroshi Shime, Itano-gun (JP); Hiroyuki Orisaka, Itano-gun (JP)

(73) Assignee: JTEKT CORPORATION, Osaka (JP)

( * ) Notice: Subject to any disclaimer, the term of this patent is extended or adjusted under 35 U.S.C. 154(b) by 80 days.

(21) Appl. No.: 16/333,745

(22) PCT Filed: Sep. 15, 2017

(86) PCT No.: PCT/JP2017/033463
§ 371 (c)(1),
(2) Date: Mar. 15, 2019

(87) PCT Pub. No.: WO2018/052116
PCT Pub. Date: Mar. 22, 2018

(65) Prior Publication Data
US 2019/0337332 A1 Nov. 7, 2019

(30) Foreign Application Priority Data
Sep. 16, 2016 (JP) .............................. JP2016-181961

(51) Int. Cl.
*F16C 43/04* (2006.01)
*F16C 35/063* (2006.01)
(Continued)

(52) U.S. Cl.
CPC .......... *F16C 43/045* (2013.01); *F16C 35/063* (2013.01); *B60B 27/0005* (2013.01);
(Continued)

(58) Field of Classification Search
CPC .. F16C 2326/02; F16C 35/063; F16C 43/045; B60B 2320/10; B60B 2900/931; B60B 27/0073; B60B 27/0026; B60B 2310/226
See application file for complete search history.

(56) References Cited

U.S. PATENT DOCUMENTS

2006/0002644 A1 1/2006 Mitsue et al.
2012/0103750 A1 5/2012 Sakamoto et al.
(Continued)

FOREIGN PATENT DOCUMENTS

CN 2621123 Y 6/2004
CN 102454726 A 5/2012
(Continued)

OTHER PUBLICATIONS

Mar. 7, 2020 Chinese Office Action issued in Chinese Application No. 201780056949.5.
(Continued)

*Primary Examiner* — Christopher J Besler
(74) *Attorney, Agent, or Firm* — Oliff PLC

(57) ABSTRACT

A method for manufacturing a hub unit includes: preparing a hub unit intermediate including an inner shaft, an inner ring fixed to an axial end of the inner shaft, and an outer ring rotatably arranged with respect to the inner shaft and the inner ring; preparing a magnetic seal member including a seal member and an annular magnetic member having no magnetic pole; and arranging the magnetic seal member between the inner ring and the outer ring of the hub unit intermediate. The method further includes: forming splines extending along the axial direction by cutting the inner circumferential surface of the inner shaft of the hub unit intermediate in which the magnetic seal member has been arranged; and forming magnetic poles in a circumferential
(Continued)

direction of the magnetic member of the hub unit intermediate in which the plurality of splines have been formed.

3 Claims, 7 Drawing Sheets

(51) Int. Cl.
*B60B 27/00* (2006.01)
*F16C 19/18* (2006.01)
*F16C 33/78* (2006.01)

(52) U.S. Cl.
CPC ....... *B60B 27/0026* (2013.01); *B60B 27/0073* (2013.01); *B60B 27/0094* (2013.01); *B60B 2310/226* (2013.01); *B60B 2320/10* (2013.01); *F16C 19/18* (2013.01); *F16C 33/78* (2013.01); *F16C 2326/02* (2013.01)

(56) References Cited

U.S. PATENT DOCUMENTS

| 2012/0223484 | A1* | 9/2012 | Yamamoto | F16C 33/7883 277/309 |
| 2014/0345392 | A1 | 11/2014 | Matsui et al. | |
| 2015/0054334 | A1 | 2/2015 | Song et al. | |
| 2016/0033303 | A1* | 2/2016 | Harano | G01D 5/12 324/207.25 |

FOREIGN PATENT DOCUMENTS

| CN | 104169700 A | 11/2014 | |
| CN | 104245355 A | 12/2014 | |
| CN | 205273044 U | 6/2016 | |
| EP | 2759727 A3 | 9/2015 | |
| JP | 2007-256097 A | 10/2007 | |
| JP | 2010-127305 A | 6/2010 | |
| JP | 2013-061052 A | 4/2013 | |
| JP | 2013-068475 A | 4/2013 | |
| WO | 2004/035326 A1 | 4/2004 | |
| WO | 2006/112214 A1 | 10/2006 | |
| WO | 2012/020654 A1 | 2/2012 | |
| WO | WO-2014168091 A1 * | 10/2014 | ............... G01D 5/12 |

OTHER PUBLICATIONS

Nov. 28, 2017 International Search Report issued in International Patent Application No. PCT/JP2017/033463.

Nov. 28, 2017 Written Opinion of the International Searching Authority issued in Internatonal Patent Application No. PCT/JP2017/033463.

* cited by examiner

METHOD FOR MANUFACTURING HUB UNIT

TECHNICAL FIELD

An aspect of the present invention relates to a method for manufacturing a hub unit for a driving wheel of a vehicle.

BACKGROUND ART

A hub unit is used to rotatably attach a wheel of a vehicle to a suspension. Further, in a vehicle having an anti-lock brake system (ABS), a magnetic encoder for detecting a rotation speed of a wheel is attached to the hub unit. The magnetic encoder has an annular shape and has a plurality of magnetic poles. The plurality of magnetic poles are arranged so that N poles and S poles are alternately positioned in a circumferential direction of the magnetic encoder.

JP-A-2007-254097 discloses a method for manufacturing a bearing device having a magnetic encoder. The bearing device manufactured by the manufacturing method has a bearing portion and a rotation sensor portion as the magnetic encoder. The bearing portion has an inner ring, an outer ring rotatably arranged with respect to the inner ring, and a plurality of rolling elements disposed between the inner ring and the outer ring. The rotation sensor portion includes a base member and a magnetic pulsar unit.

In the manufacturing method disclosed in JP-A-2007-254097, first, the bearing portion is assembled. The base member has an annular shape and is press-fitted to an outer circumferential side surface of the inner ring in the assembled bearing portion. A resin layer is formed on the outer circumferential side surface of the base member by discharging a magnetic ink onto the outer circumferential side surface of the base member by an ink-jet method. The resin layer is magnetized by a magnetizing device, in such a manner that the magnetic pulsar portion is formed.

There are two kinds of hub units, a hub unit for a driving wheel and a hub unit for a driven wheel.

The hub unit for a driving wheel includes an inner shaft, an inner ring, an outer ring, a plurality of first rolling elements, a plurality of second rolling elements, a seal member, and a pulsar ring.

The inner ring is disposed coaxially with the inner shaft and is fixed to one axial end portion of the inner shaft. The outer ring is rotatably arranged with respect to the inner shaft and the inner ring. The first rolling element is disposed between the inner shaft and the outer ring. The second rolling element is disposed between the inner ring and the outer ring. The seal member has an annular shape and seals a gap formed between the inner ring and the outer ring. Further, the pulsar ring in which a plurality of magnetic poles are arranged in the circumferential direction is disposed on one axial end surface of the seal member.

A plurality of splines extending in the axial direction are formed in advance on an inner circumferential surface of a hole passing through the inner shaft in the axial direction. When a hub unit for a driving wheel is manufactured, an end portion on one side of the inner shaft is press-fitted into the inner ring. The splines previously formed on the inner circumferential surface of the inner shaft are slightly deformed by press-fitting.

Although the extent of deformation is slight, the splines formed on the inner circumferential surface of the inner shaft is deformed, and therefore metallic sound may be generated at contact portions between the splines formed on the inner circumferential surface of the inner shaft and splines formed on an outer circumferential side surface of a drive shaft when the drive shaft inserted in the hole of the inner shaft rotates. In order to prevent the generation of the metallic sound, it is preferable to prevent deformation of the spline formed on the inner circumferential surface of the inner shaft and improve the forming accuracy of the spline formed on the inner circumferential surface of the inner shaft.

Deformation of the spline formed on the inner circumferential surface of the inner shaft can be prevented by cutting the inner circumferential surface of the inner shaft and forming the spline after the hub unit for a driving wheel is assembled. However, there is a worry that metal pieces generated by cutting may adhere to a magnetic pole of the pulsar ring. When the metal pieces stick to the magnetic pole in the pulsar ring, the detection accuracy of a rotation speed of a wheel is lowered. In addition, when a surface of the pulsar ring is scratched by the metal pieces, the detection accuracy of the rotation speed of the wheel is lowered.

RELATED ART DOCUMENT(S)

Patent Document(s)

Patent Literature 1: JP-A-2007-256097

SUMMARY OF THE INVENTION

Problem to be Solved by the Invention

An object of an aspect of the invention is to provide a method for manufacturing a hub unit for a driving wheel which can improve both the detection accuracy of a rotation speed of a wheel and the forming accuracy of a spline formed on an inner circumferential surface of an inner shaft.

Means for Solving the Problem

A method for manufacturing a hub unit according to the present disclosure includes the steps of a), b), c), d), and e). In the step a), a hub unit intermediate is prepared. The hub unit intermediate includes an inner shaft, an inner ring fixed to an axial end of the inner shaft, and an outer ring rotatably arranged with respect to the inner shaft and the inner ring. In the step b), a magnetic seal member is prepared. The magnetic seal member includes a seal member having an annular surface extending in a radial direction perpendicular to an axial direction when the seal member is arranged to be coaxial with a central axis of the inner shaft, and an annular magnetic member arranged on the annular surface and having no magnetic pole. In the step c), the magnetic seal member is arranged in a gap formed between the inner ring and the outer ring of the hub unit intermediate. In the step d), a plurality of splines extending along the axial direction of the inner shaft are formed on an inner circumferential surface of the inner shaft by cutting the inner circumferential surface of the inner shaft of the hub unit intermediate in which the magnetic seal member has been arranged. In the step e), a plurality of magnetic poles are formed in a circumferential direction of the magnetic member of the hub unit intermediate in which the plurality of splines have been formed.

Advantages of the Invention

According to a method for manufacturing a hub unit according to the present disclosure, it is possible to improve the measurement accuracy of a rotation speed of a wheel and the accuracy of a spline.

MODE FOR CARRYING OUT THE INVENTION

Figure 1:
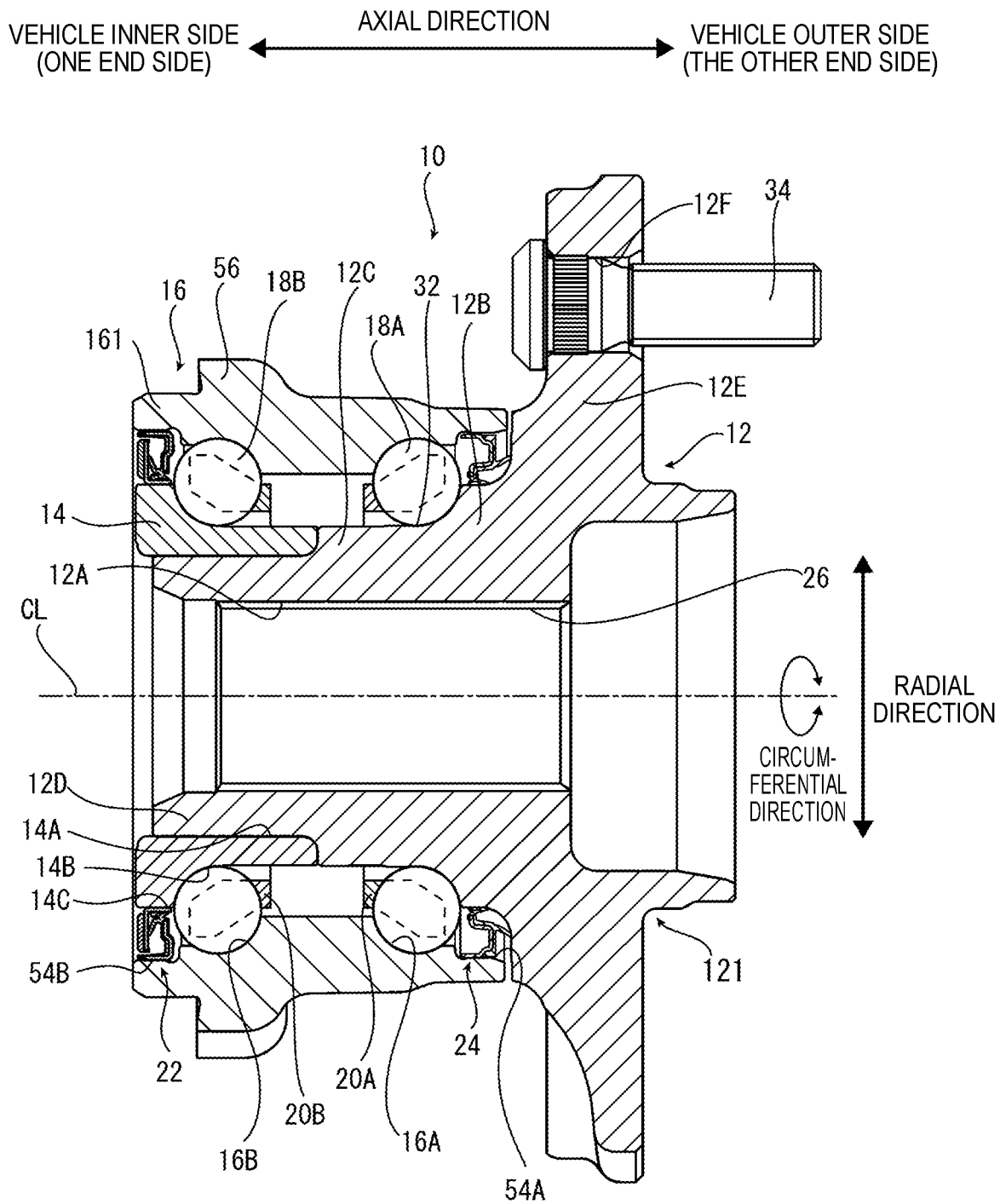
FIG. 1 is a cross-sectional view of a hub unit according to an embodiment of the invention.

A method for manufacturing a hub unit according to an embodiment includes the steps of a), b), c), d), and e). In the step a), a hub unit intermediate is prepared. The hub unit intermediate includes an inner shaft, an inner ring fixed to an axial end of the inner shaft, and an outer ring rotatably arranged with respect to the inner shaft and the inner ring. In the step b), a magnetic seal member is prepared. The magnetic seal member includes a seal member having an annular surface extending in a radial direction perpendicular to an axial direction when the seal member is arranged to be coaxial with a central axis of the inner shaft, and an annular magnetic member arranged on the annular surface and having no magnetic pole. In the step c), the magnetic seal member is arranged in a gap formed between the inner ring and the outer ring of the hub unit intermediate. In the step d), a plurality of splines extending along the axial direction of the inner shaft are formed on an inner circumferential surface of the inner shaft by cutting the inner circumferential surface of the inner shaft of the hub unit intermediate in which the magnetic seal member has been arranged. In the step e), a plurality of magnetic poles are formed in a circumferential direction of the magnetic member of the hub unit intermediate in which the plurality of splines have been formed (first configuration).

According to the first configuration, the splines are formed on the inner circumferential surface of the inner shaft by cutting after the magnetic member including the magnetic member having no magnetic pole is arranged between the inner ring and the outer ring. Then, the magnetic member is magnetized. It is possible to prevent the metal pieces generated by cutting the inner circumferential surface of the inner shaft from sticking to the magnetic member due to the magnetic force or scratching the magnetic member. Further, since spline formation is performed on the hub unit intermediate in which the inner shaft, the inner ring, and the outer ring are assembled, deformation of the spline can be prevented. Therefore, it is possible to improve the measurement accuracy of the rotation speed of the wheel and the accuracy of the spline.

The method for manufacturing the hub unit may further include the step of f). In the step f), the magnetism remaining in the inner ring and the outer ring is removed after the step e) (second configuration).

According to the second configuration, it is possible to prevent the magnetism remaining in the inner ring and the outer ring from affecting the detection accuracy of the rotation speed of the wheel. As a result, it is possible to further improve the measurement accuracy of the rotation speed of the wheel.

In the step e) described above, in a state where a magnetizing yoke having a cylindrical shape is arranged coaxially with the hub unit intermediate, a plurality of iron core portions positioned on an end surface of the magnetizing yoke facing the hub unit intermediate and arranged in the circumferential direction may be brought into contact with the magnetic member arranged in the hub unit intermediate (third configuration).

According to the third configuration, even when the magnetic seal member arranged in a gap formed between the inner ring and the outer ring is slightly deformed, the plurality of magnetic poles formed in the magnetic member are arranged in the circumferential direction. Therefore, it is possible to improve the measurement speed of the rotation speed of the wheel.

Hereinafter, an embodiment of the invention will be described in detail with reference to the drawings. Identical or equivalent parts in the drawings are denoted by the same reference signs and description thereof will not be repeated.

Figure 2:
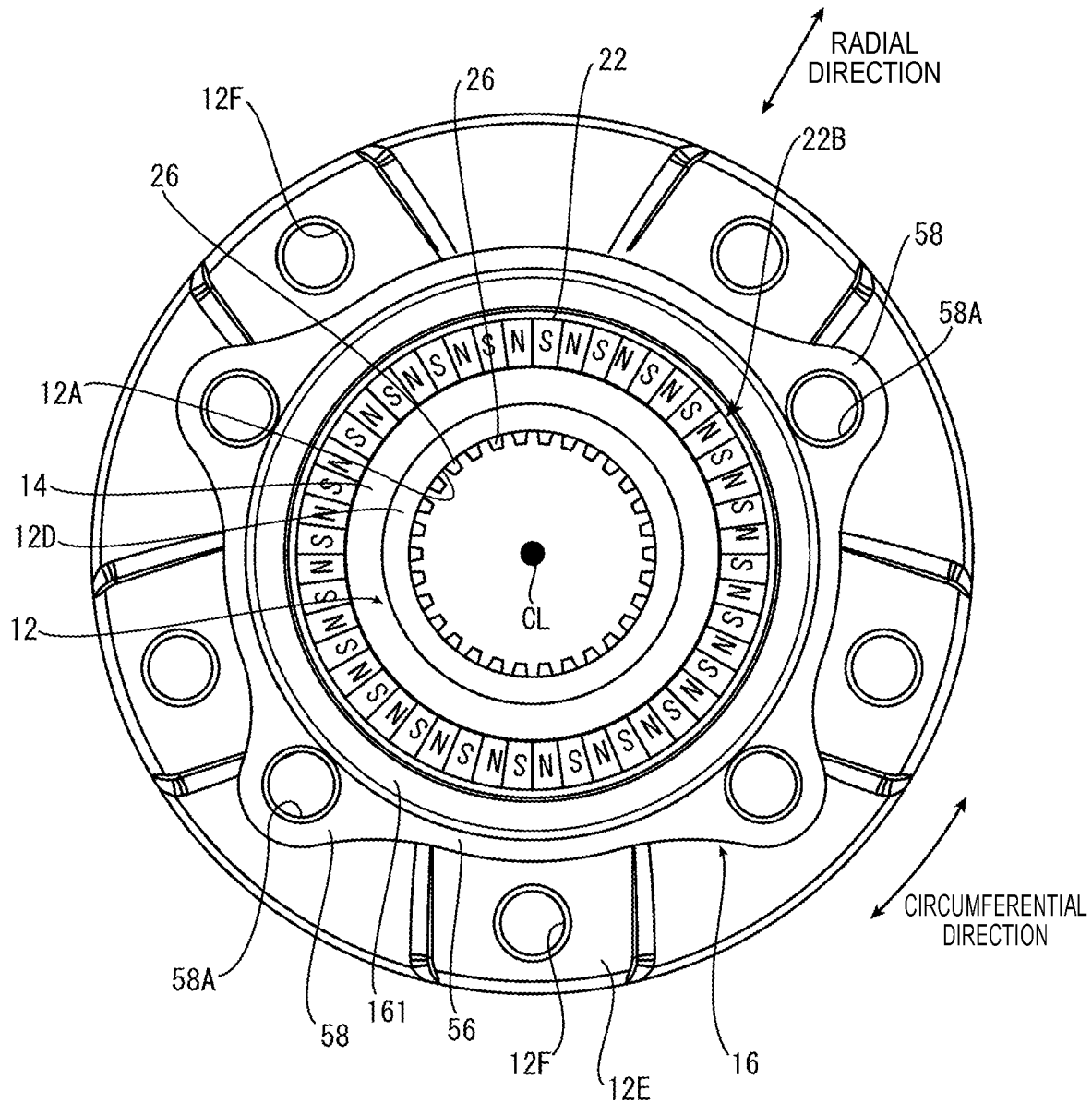
FIG. 2 is a view of the hub unit illustrated in FIG. 1 when seen from an inside of a vehicle toward an outside of the vehicle.

FIG. 1 is a cross-sectional view of a hub unit 10 according to the embodiment of the invention. That is, FIG. 1 is a cross-sectional view of the hub unit 10 in which the hub unit 10 is cut on a plane including a central axis line CL. FIG. 2 is a view of the hub unit 10 illustrated in FIG. 1 when seen from an inside of a vehicle toward an outside of the vehicle.

In the following description, an axial direction of the hub unit 10 is a direction in which the central axis line CL of the hub unit 10 extends. A radial direction of the hub unit 10 is a direction perpendicular to the central axis line CL, that is, a direction perpendicular to the axial direction. A circumferential direction of the hub unit 10 is a circumferential direction around the central axis line CL. In a state where the hub unit 10 is disposed in the vehicle, one end side (left end side in FIG. 1) in the axial direction of the hub unit 10 corresponds to the inside of the vehicle and the other end side (right end side in FIG. 1) in the axial direction of the hub unit 10 corresponds to the outside of the vehicle.

(1. Configuration of Hub Unit 10)

Referring to FIG. 1, the hub unit 10 includes an inner shaft 12, an inner ring 14, an outer ring 16, a plurality of rolling elements 18A, a plurality of rolling elements 18B, a retainer 20A, a retainer 20B, a magnetic encoder 22, and a seal member 24.

The inner shaft 12 is an annular member of which an axial center is the central axis line CL. The inner shaft 12 includes a main body 121. The main body 121 has a cylindrical shape and includes a hole 12A. The hole 12A passes through the main body 121 in the axial direction and a central axis of the hole 12A coincides with the central axis line CL.

The main body 121 includes a plurality of splines 26. The plurality of splines 26 are formed on an inner circumferential surface (that is, the inner circumferential surface of the hole 12A) of the main body 121. The plurality of splines 26 extend straight in the axial direction and are arranged at equal intervals in the circumferential direction. In other words, a plurality of grooves extending in the axial direction and formed at equal intervals in the circumferential direction are formed on the inner circumferential surface of the main body 121.

A drive shaft is inserted into the hole 12A. Splines with the same pitch width as the pitch width of the plurality of splines 26 are formed on an outer circumferential side surface of the drive shaft. As the drive shaft is inserted into the hole 12A, the inner shaft 12 is engaged with the drive shaft and rotates in accordance with the rotation of the drive shaft.

The main body 121 further includes a large diameter portion 12B, a medium diameter portion 12C, and a small diameter portion 12D. The large diameter portion 12B is positioned closer to the other end side than the medium diameter portion 12C and the small diameter portion 12D in the axial direction.

The medium diameter portion 12C has an outer diameter smaller than that of the large diameter portion 12B. The medium diameter portion 12C is located between the large diameter portion 12B and the small diameter portion 12D in the axial direction. The medium diameter portion 12C includes a raceway surface 32. The raceway surface 32 is formed on an outer circumferential surface of the medium diameter portion 12C.

The small diameter portion 12D has a smaller outer diameter than that of the medium diameter portion 12C. The small diameter portion 12D is located adjacent to the medium diameter portion 12C in the axial direction. That is, the small diameter portion 12D is positioned closer to one end side than the medium diameter portion 12C and the large diameter portion 12B in the axial direction.

The inner shaft 12 further includes a flange 12E. The flange 12E is formed on the outer circumferential surface of the main body 121. The flange 12E is formed continuously in the circumferential direction. That is, the flange 12E is formed in an annular shape. The flange 12E has a larger outer diameter than that of the large diameter portion 12B. The flange 12E is located adjacent to the large diameter portion 12B in the axial direction.

Referring to FIG. 2, the flange 12E includes a plurality of holes 12F. The plurality of holes 12F are formed, for example, at equal intervals in the circumferential direction. A wheel, a brake disk, and the like are attached to the inner shaft 12 by bolts 34 inserted into the plurality of holes 12F.

Referring again to FIG. 1, the inner ring 14 is disposed coaxially with the inner shaft 12. That is, the inner ring 14 is an annular member having the central axis line CL as an axis thereof. In other words, the axial direction of the inner ring 14 coincides with the axial direction of the inner shaft 12.

The inner ring 14 includes a hole 14A. The hole 14A passes through the inner ring 14 in the axial direction. A central axis of the hole 14A coincides with the central axis line CL. The inner ring 14 is fixed to the inner shaft 12. Specifically, as the small diameter portion 12D of the inner shaft 12 is press-fitted into the inner ring 14, the inner ring 14 is fixed to an outer circumferential portion of the inner shaft 12.

The inner ring 14 includes a raceway surface 14B and a cylindrical surface 14C. The raceway surface 14B is formed on an outer circumferential surface of the inner ring 14. The cylindrical surface 14C is formed on the outer circumferential surface of the inner ring 14 and is positioned closer to the one end side than the raceway surface 14B in the axial direction.

The outer ring 16 is arranged radially outward of the inner shaft 12 and the inner ring 14 and is located coaxially with the inner shaft 12 and the inner ring 14. That is, the outer ring 16 is an annular member having the central axis line CL as an axis thereof. The outer ring 16 is rotatably arranged with respect to the inner shaft 12 and the inner ring 14. The outer ring 16 includes a main body 161. The main body 161 has a cylindrical shape.

The main body 161 includes a raceway surface 16A and a raceway surface 16B. The raceway surface 16A and the raceway surface 16B are formed on an inner circumferential surface of the main body 161. The raceway surface 16A and the raceway surface 16B are separated in the axial direction.

The main body 161 further includes a cylindrical surface 54A and a cylindrical surface 54B. The cylindrical surface 54A and the cylindrical surface 54B are formed on an inner circumferential surface of the main body 161. The cylindrical surface 54A and the cylindrical surface 54B are separated in the axial direction.

The cylindrical surface 54A is located at the end portion on the other axial end side of the main body 161. In other words, the cylindrical surface 54A is located axially opposite the raceway surface 16B with respect to the raceway surface 16A. The cylindrical surface 54B is located at the end portion on the one axial end side of the main body 161. In other words, the cylindrical surface 54B is located axially opposite the raceway surface 16A with respect to the raceway surface 16B. That is, the raceway surface 16A and the raceway surface 16B are positioned between the cylindrical surface 54A and the cylindrical surface 54B in the axial direction.

The outer ring 16 further includes a flange 56. The flange 56 is formed on an outer circumferential surface of the main body 161.

Referring to FIG. 2, the flange 56 is formed continuously in the circumferential direction. That is, the flange 56 is formed in an annular shape. The flange 56 includes a plurality of attachment portions 58. The plurality of attachment portions 58 are formed, for example, at predetermined positions in the circumferential direction. Each of the plurality of attachment portions 58 includes a hole 58A. A suspension is fixed to the outer ring 16 by a bolt inserted into the hole 58A.

The plurality of rolling elements 18A are disposed between the inner shaft 12 and the outer ring 16. The plurality of rolling elements 18A are equally spaced in the circumferential direction by the retainer 20A. Each of the plurality of rolling elements 18A is in contact with the raceway surface 16A and the raceway surface 32.

The plurality of rolling elements 18B are arranged between the inner ring 14 and the outer ring 16. The plurality of rolling elements 18B are equally spaced in the circumferential direction by the retainer 20B. Each of the plurality of rolling elements 18B is in contact with the raceway surface 14B and the raceway surface 16B.

The seal member 24 is disposed between the inner shaft 12 and the outer ring 16. The seal member 24 is an annular member and is press-fitted onto the large diameter portion 12B of the inner shaft 12. The seal member 24 is in contact with an outer circumferential side surface of the large diameter portion 12B of the inner shaft 12 and the cylindrical surface 54A of the outer ring 16. As a result, the seal member 24 seals the space between the outer circumferential surface of the large diameter portion 12B of the inner shaft 12 and the cylindrical surface 54A of the outer ring 16.

The magnetic encoder 22 is arranged between the inner ring 14 and the outer ring 16. Specifically, the magnetic encoder 22 is disposed between the cylindrical surface 14C of the inner ring 14 and the cylindrical surface 54B of the outer ring 16.

Figure 3:
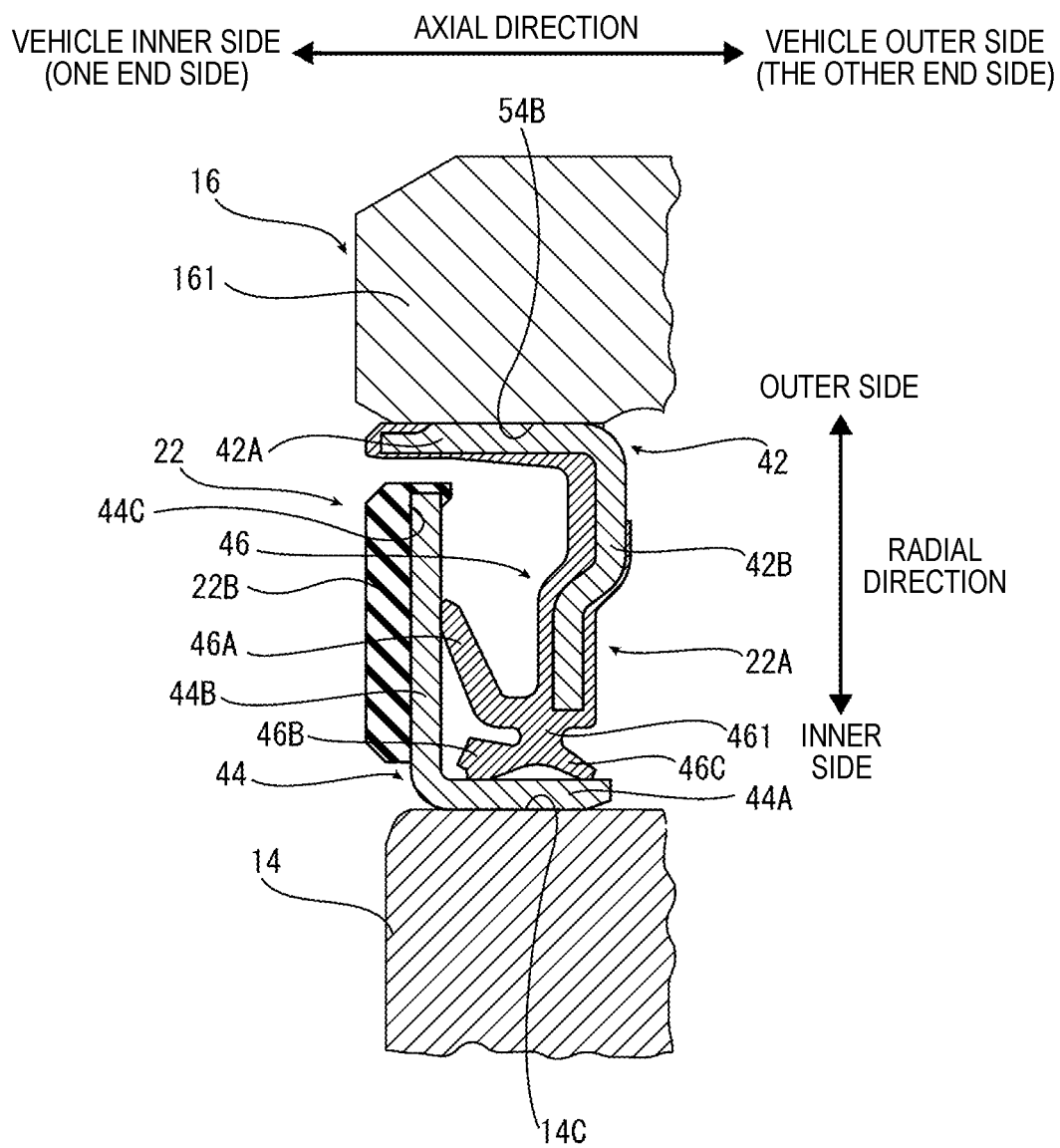
FIG. 3 is an enlarged cross-sectional view of a magnetic encoder included in the hub unit illustrated in FIG. 1.

FIG. 3 is an enlarged cross-sectional view of the magnetic encoder 22 included in the hub unit 10 illustrated in FIG. 1. Referring to FIG. 3, the magnetic encoder 22 includes a seal member 22A and a pulsar ring 22B.

The seal member 22A is an annular member which continuously extends in the circumferential direction. The seal member 22A includes a core metal 42, a slinger 44, and a seal rubber 46.

The slinger 44 is a member extending continuously in the circumferential direction. That is, the slinger 44 is an annular member having the central axis line CL as a center thereof. The slinger 44 includes a cylindrical portion 44A and an annular plate portion 44B.

The cylindrical portion 44A extends in the axial direction. The annular plate portion 44B spreads in a radial direction perpendicular to the axial direction. The annular plate portion 44B is formed to have substantially the same width over the entire circumference in the circumferential direction. That is, the annular plate portion 44B has an annular shape when viewed from the axial direction. The annular plate portion 44B is connected to the end portion on the one axial end side of the cylindrical portion 44A. The annular plate portion 44B extends outward in the radial direction from the end portion on the one axial end side of the cylindrical portion 44A. The annular plate portion 44B includes an annular surface 44C. The annular surface 44C is a surface on one axial end side of the annular plate portion 44B. The annular surface 44C corresponds to an end surface on the one axial end side of the magnetic encoder 22.

The core metal 42 is a member extending continuously in the circumferential direction. That is, the core metal 42 is an annular member of which an axial center is the central axis line CL. The core metal 42 includes a cylindrical portion 42A and an annular plate portion 42B.

The cylindrical portion 42A extends in the axial direction. The annular plate portion 42B spreads in the radial direction perpendicular to the axial direction. The annular plate portion 42B is formed to have substantially the same width over the entire circumference in the circumferential direction. That is, the annular plate portion 42B has an annular shape when viewed from the axial direction. The annular plate portion 42B is connected to the end on the other axial end side of the cylindrical portion 42A. The annular plate portion 42B extends inward in the radial direction from the end on the other axial end side of the cylindrical portion 42A.

The seal rubber 46 covers substantially the entire surface of the core metal 42 except for a part of the outer circumferential surface of the cylindrical portion 42A and a part of the surface of the annular plate portion 42B which is a part of the surface connected to the outer circumferential surface of the cylindrical portion 42A. The seal rubber 46, for example, is adhered to the core metal 42. That is, the seal rubber 46 is integrally formed with the core metal 42.

The seal rubber 46 includes lips 46A, 46B, and 46C. Each of the lips 46A, 46B, and 46C is formed over the entire circumference in the circumferential direction. That is, the lips 46A, 46B, and 46C are annular members with the central axis line CL as the center. The lip 46A extends toward the annular plate portion 44B of the slinger 44 from a base portion 461 of the seal rubber 46 which is located at the radially inner side end portion of the annular plate portion 42B of the core metal 42. Each of the lips 46B and 46C extends from the base portion 461 towards the cylindrical portion 44A of the slinger 44.

The seal member 22A is formed by combining the slinger 44 with the core metal 42. In the seal member 22A, the slinger 44 is arranged coaxially with the core metal 42. Specifically, the slinger 44 is disposed inside the cylindrical portion 42A. The cylindrical portion 44A of the slinger 44 faces the cylindrical portion 42A of the core metal 42 in a radial direction. The entirety of the slinger 44 is hidden by the core metal 42 when seen from the radial direction. The annular plate portion 44B faces the annular plate portion 42B in the axial direction. The slinger 44 is rotatable with respect to the core metal 42.

In the seal member 22A, the lips 46A, 46B, and 46C are in contact with the slinger 44. More specifically, the lip 46A is pressed against the annular plate portion 44B over the entire circumference in the circumferential direction by the elasticity of the lip 46A. The lip 46B is pressed against the cylindrical portion 44A over the entire circumference in the circumferential direction by the elasticity of the lip 46B. The lip 46C is pressed against the cylindrical portion 44A over the entire circumference in the circumferential direction by the elasticity of the lip 46C. As a result, the space between the core metal 42 and the slinger 44 is sealed by the seal rubber 46.

The pulsar ring 22B is an annular member which is continuous in the circumferential direction. That is, the pulsar ring 22B is an annular member having the central axis line CL as an axis thereof. Referring to FIG. 2, the pulsar ring 22B is a multipolar magnet in which N poles and S poles are alternately arranged in the circumferential direction.

Referring to FIG. 3, the pulsar ring 22B is fixed to the annular surface 44C which is the end surface on the one axial end side of the annular plate portion 44B of the slinger 44. The pulsar ring 22B is fixed to the annular plate portion 44B by, for example, adhering.

The pulsar ring 22B is made of a material in which a magnetic powder and a binder are mixed. Ferrite or the like, for example, can be used as the magnetic powder. An organic polymer can be used as the binder. For example, rubber materials such as acrylic rubber and nitrile rubber, thermoplastic resins, and the likes can be used as the binder.

In a state where the outer ring 16 is fixed to the suspension, a magnetic sensor is positioned closer to the vehicle inner side than the pulsar ring 22B so as to face the pulsar ring 22B. The pulsar ring 22B rotates together with the inner shaft 12 and the inner ring 14. The magnetic sensor detects the change in magnetism caused by the rotation of the pulsar ring 22B as the rotation of the wheel.

(2. Method for Manufacturing Hub Unit 10)

Figure 4:
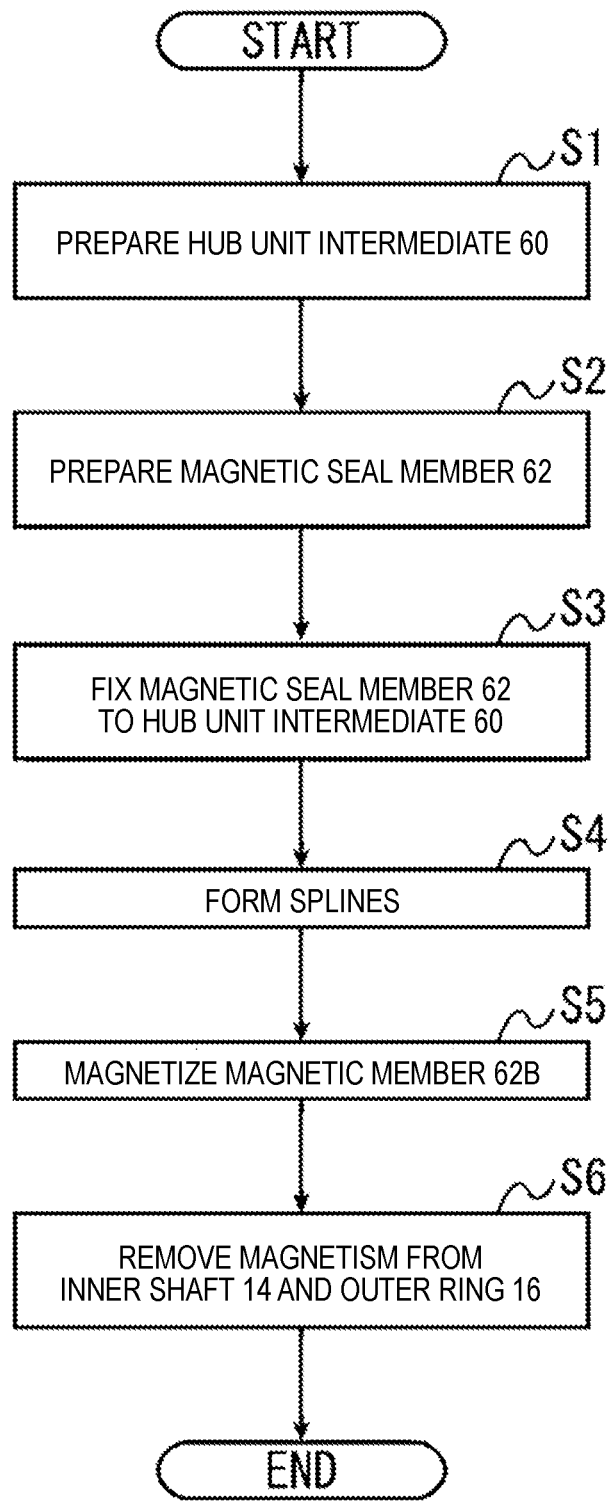
FIG. 4 is a flow chart illustrating a method of manufacturing the hub unit illustrated in FIG. 1.

FIG. 4 is a flow chart illustrating a manufacturing process of the hub unit 10. A method for manufacturing the hub unit 10 will be described with reference to FIG. 4.

Figure 5:
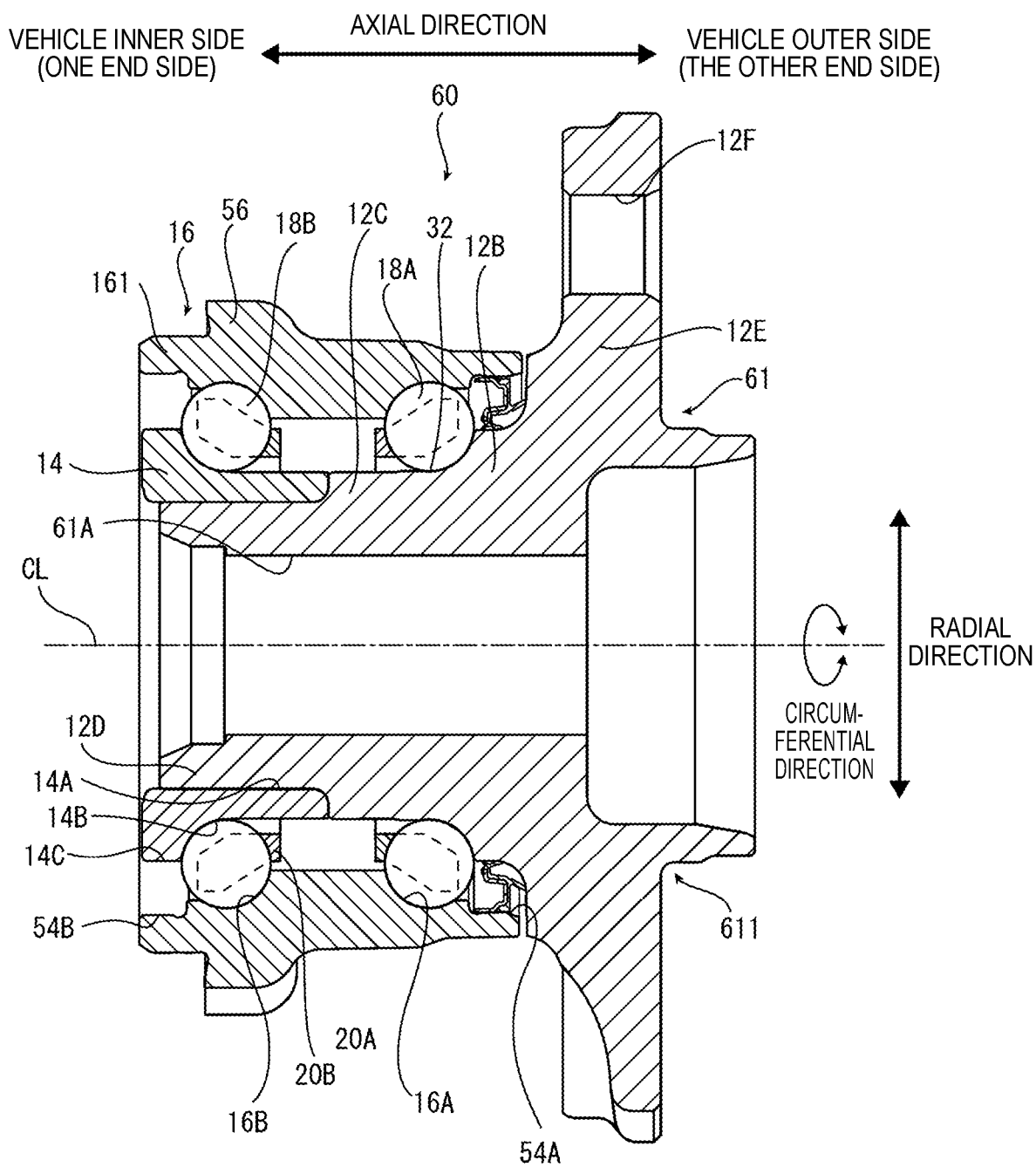
FIG. 5 is a cross-sectional view of a hub unit intermediate used for manufacturing the hub unit illustrated in FIG. 1.

First, a hub unit intermediate is prepared (Step S1). FIG. 5 is a cross-sectional view of the hub unit intermediate 60. That is, FIG. 5 is a cross-sectional view of the hub unit intermediate 60 obtained by cutting the hub unit intermediate 60 on a plane including the central axis line CL.

The difference between the hub unit intermediate 60 illustrated in FIG. 5 and the hub unit 10 illustrated in FIG. 1 is the following two points.

A first difference is that the hub unit 10 has the magnetic encoder 22, whereas the hub unit intermediate 60 does not have the magnetic encoder 22. A second difference is that the hub unit intermediate 60 has an inner shaft 61 instead of the inner shaft 12.

The inner shaft 61 includes a main body 611. The main body 611 has a cylindrical shape and includes a hole 61A. The hole 61A passes through the main body 61 in the axial direction and the central axis of the hole 61A coincides with the central axis line CL. The plurality of splines 26 are formed on the inner circumferential surface of the inner shaft 12, whereas the plurality of splines 26 are not formed on an inner circumferential surface of the inner shaft 61. That is, an inner diameter of the hole 61A is smaller than the maximum diameter of the hole 12A of the inner shaft 12. The maximum diameter of the hole 12A is a value obtained by doubling the distance from the central axis line CL to the bottom surface of the groove formed on the inner circumferential surface of the inner shaft 12. The configuration of the main body 611 is the same as that of the main body 121 except that it includes the hole 61A.

The method for manufacturing the hub unit intermediate 60 is not particularly limited as long as the hub unit intermediate 60 illustrated in FIG. 5 can be prepared in Step S1.

Figure 6:
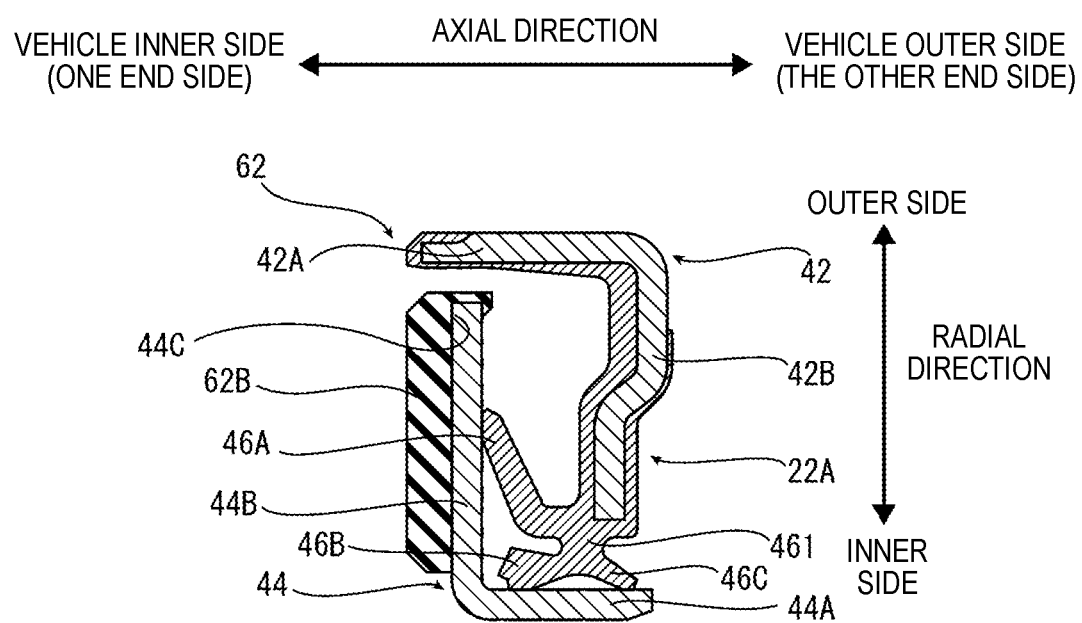
FIG. 6 is a cross-sectional view of a magnetic seal member used for manufacturing the hub unit illustrated in FIG. 1.

Referring to FIG. 4, a magnetic seal member is prepared after Step S1 (Step S2). FIG. 6 is a partial cross-sectional view of the magnetic seal member 62 prepared in Step S2. The magnetic seal member 62 illustrated in FIG. 6 is used for manufacturing the magnetic encoder 22 illustrated in FIG. 3.

At the time of executing Step S2, the magnetic seal member 62 is not fixed to the hub unit intermediate 60. However, for the sake of convenience, FIG. 6 illustrates a cross-sectional view of a part of the magnetic seal member 62 in a case where the magnetic seal member 62 is fixed to the hub unit intermediate 60 and the magnetic seal member 62 is cut on the plane including the central axis line CL. In FIG. 6, directions when the magnetic seal member 62 is fixed to the hub unit intermediate 60 are illustrated.

Referring to FIG. 6, the magnetic seal member 62 includes the seal member 22A and a magnetic member 62B. The magnetic seal member 62 has a magnetic member 62B instead of the pulsar ring 22B. Other configurations of the magnetic seal member 62 are the same as those of the magnetic encoder 22.

The magnetic member 62B has the same shape as that of the pulsar ring 22B and is an annular member continuing in the circumferential direction. That is, the magnetic member 62B is an annular member having the central axis line CL as an axis thereof when it is fixed to the hub unit intermediate 60. Similarly to the pulsar ring 22B, the magnetic member 62B is made of a material in which a magnetic powder and a binder are mixed. The magnetic member 62B is not magnetized and N poles and S poles are not arranged alternately at equal intervals in the circumferential direction. That is, the magnetic member 62B is the pulsar ring 22B before being magnetized.

Similarly to the pulsar ring 22B, the magnetic member 62B is fixed to the annular surface 44C which is the end surface on the one axial end side of the annular plate portion 44B of the slinger 44. The annular surface 44C corresponds to the end surface on the one axial end side of the magnetic seal member 62.

Referring again to FIG. 4, after Step S2, the magnetic seal member 62 is fixed to the hub unit intermediate 60 (Step S3). Specifically, as illustrated in FIG. 3, the magnetic seal member 62 is press-fitted to a portion between the cylindrical surface 14C of the inner ring 14 and the cylindrical surface 54B of the outer ring 16 so that the magnetic seal member 62 is arranged in a gap formed between the inner ring 14 and the outer ring 16. More specifically, the cylindrical portion 42A of the core metal 42 is press-fitted into the outer ring 16 and the inner ring 14 is press-fitted into the cylindrical portion 44A of the slinger 44. As a result, the outer circumferential surface of the cylindrical portion 42A is in contact with the cylindrical surface 54B and the inner circumferential surface of the cylindrical portion 44A is in contact with the cylindrical surface 14C of the inner ring 14.

In the hub unit intermediate 60, the seal member 24 has already been placed in the gap between the outer ring 16 and the large diameter portion 12B of the inner shaft 12. As a result, the spaces between the outer ring 16 and the inner shaft 12 and between the outer ring 16 and the inner ring 14 are sealed by the seal member 24 and the magnetic seal member 62.

Referring to FIG. 4, in the hub unit intermediate 60 to which the magnetic seal member 62 is fixed, the plurality of splines 26 extending in the axial direction are formed on the inner circumferential surface of the main body 611 of the inner shaft 61 (Step S4). Specifically, the inner circumferential surface of the main body 611 is cut so that a plurality of grooves extending in the axial direction are formed on the inner circumferential surface of the main body 611 at equal intervals in the circumferential direction. By executing Step S4, the inner shaft 61 of the hub unit intermediate 60 becomes the inner shaft 12 including the plurality of splines 26. For example, broaching can be used for cutting the inner circumferential surface of the main body 611.

Figure 7:
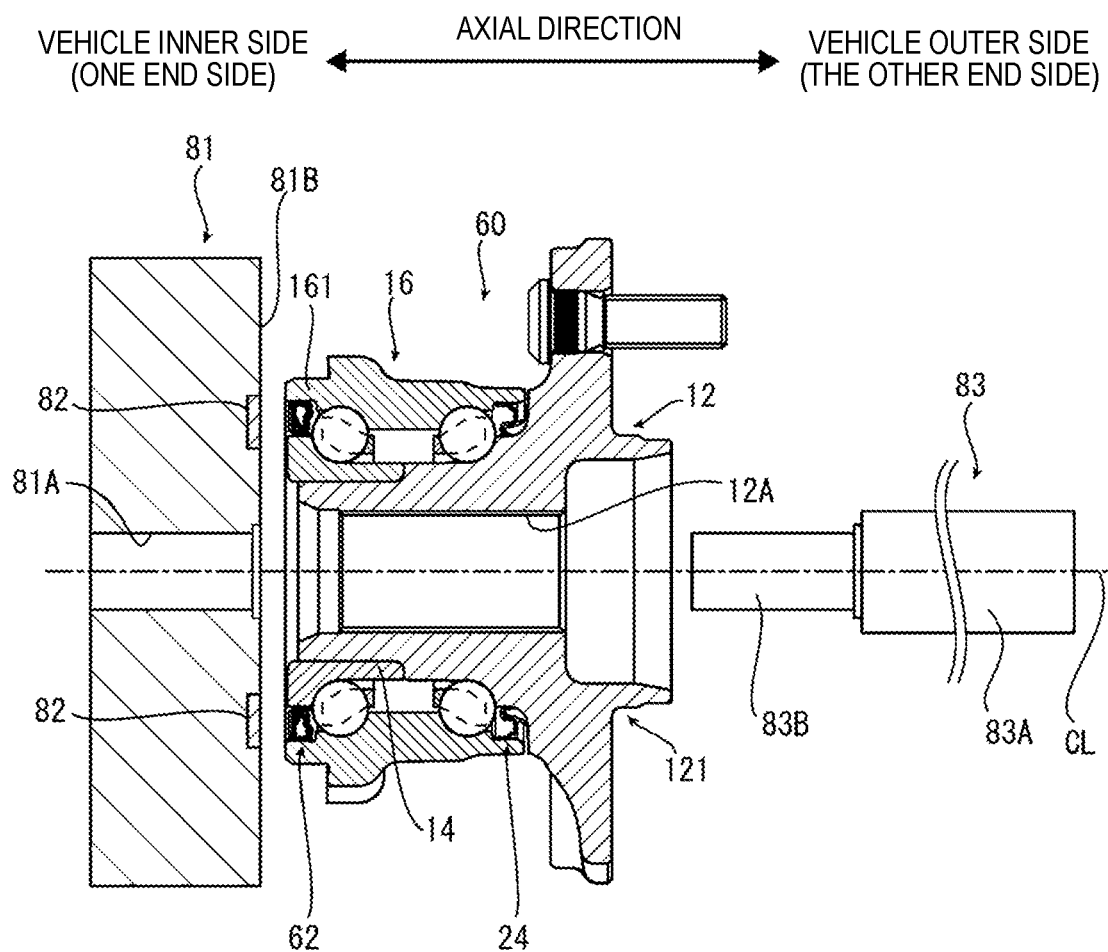
FIG. 7 is a view for explaining a method of magnetizing the magnetic member illustrated in FIG. 6.

Next, the magnetic member 62B of the magnetic seal member 62 is magnetized (Step S5). FIG. 7 is a view for explaining a method of magnetizing the magnetic member 62B. Referring to FIG. 7, a magnetizing yoke 81 is used for magnetizing the magnetic member 62B.

The magnetizing yoke 81 constitutes a magnetizing device together with a power supply device (not illustrated). The magnetizing yoke 81 has a cylindrical shape and includes a hole 81A. The hole 81A passes through the magnetizing yoke 81 in the axial direction.

Further, the magnetizing yoke 81 includes a plurality of iron core portions 82. In a case where the hub unit intermediate 60 and the magnetizing yoke 81 are arranged in a positional relationship illustrated in FIG. 7, the plurality of iron core portions 82 are arranged on an end surface 81B of axial end surfaces of the magnetizing yoke 81 which faces the hub unit intermediate 60. The plurality of iron core portions 82 are arranged in the circumferential direction on the end surface 81B. That is, in the end surface 81B, the plurality of iron core portions 82 are arranged in an annular region around the central axis.

Although not illustrated in FIG. 7, in the magnetizing yoke 81, a coil is wound around each of the plurality of iron core portions 82. The power supply device controls the magnitude and direction of the current flowing through the coil wound on each of the plurality of iron core portions 82.

The hub unit intermediate 60 and the magnetizing yoke 81 are aligned by centering using a centering member 83. The magnetic member 62B is magnetized by bringing the iron core portion 82 of the magnetizing yoke 81 into contact with the magnetic member 62B.

Specifically, the centering member 83 is inserted into the hole 12A of the inner shaft 12 and the hole 81A of the magnetizing yoke 81 from the other end side of the hub unit intermediate 60. The centering member 83 is inserted so that an insertion portion 83A is positioned in the hole 12A of the inner shaft 12 and an insertion portion 83B is positioned in the hole 81A of the magnetizing yoke 81.

Although not illustrated in FIG. 7, similarly to the drive shaft, the insertion portion 83A of the centering member 83 has splines formed on an outer circumferential side surface thereof. That is, the shape of a cross-section perpendicular to the central axis line CL in the insertion portion 83A is similar to that of the cross-section perpendicular to the central axis line CL of the hole 12A in the drive shaft. Therefore, the insertion portion 83A is engaged with the inner shaft 12 by being inserted into the hole 12A of the inner shaft 12.

The insertion portion 83B of the centering member 83 has a cylindrical shape and is inserted into the hole 81A of the magnetizing yoke 81. The diameter of the insertion portion 83B is equal to the inner diameter of the hole 81A.

The hub unit intermediate 60 and the magnetizing yoke 81 are aligned by inserting the centering member 83 into the hole 12A of the inner shaft 12 and the hole 81A of the magnetizing yoke 81 as described above. That is, by using the centering member 83, it is possible to make the central axis of the magnetizing yoke 81 coincide with the central axis line CL of the hub unit intermediate 60.

The end surface 81B of the magnetizing yoke 81 is brought into contact with the end surface of the magnetic member 62B in a state where the centering member 83 is inserted into the magnetizing yoke 81 and the inner shaft 12 of the hub unit intermediate 60. In the annular region of the end surface 81B where the plurality of iron core portions 82 are arranged, the inner diameter of the annular region is the same as the inner diameter of the magnetic member 62B and the outer diameter of the annular region is the same as the outer diameter of the magnetic member 62B. Therefore, when the magnetizing yoke 81 aligned to the hub unit intermediate 60 is brought into contact with the magnetic member 62B, the plurality of iron core portions 82 are brought into contact with the magnetic member 62B.

A current is supplied from the power supply device to the coil wound on each of the plurality of iron core portions 82 in a state where the plurality of iron core portions 82 are in contact with the magnetic member 62B. As a current flows through the coil, magnetic poles are generated in the plurality of iron core portions 82. The magnetic poles generated in the plurality of iron core portions 82 are transferred to the magnetic member 62B. The direction of the current flowing through the coils is adjusted so that different magnetic poles are generated in two iron core portions 82 adjacent to each other in the circumferential direction. That is, the plurality of iron core portions in which the magnetic poles are respectively generated are brought into contact with the magnetic member 62B. As the magnetic poles generated in the plurality of iron core portions 82 are transferred to the magnetic member 62B, a plurality of magnetic poles as illustrated in FIG. 2 are arranged in the circumferential direction in the magnetic member 62B.

The magnetic member 62B becomes the pulsar ring 22B by alternately arranging the N poles and the S poles at equal intervals in the circumferential direction of the magnetic member 62B as described above.

Next, with reference to FIG. 4, the magnetism in the inner ring 14 and the outer ring 16 is removed (Step S6). An alternating current attenuation method or a thermal demagnetization method, for example, can be used as a method for removing the magnetism in the inner ring 14 and the outer ring 16. In the alternating current attenuation method, coils for passing alternating current are brought into close with the end surfaces of the one end side of the inner ring 14 and the outer ring 16, which are objects of demagnetization, and the current flowing through the coils is gradually weakened. The thermal demagnetization method is a method of removing magnetism by heating the end surfaces on the one end side of the inner ring 14 and the outer ring 16, which are objects of demagnetization, to the Curie temperature.

when, in Step S5, the magnetizing yoke 81 is brought into contact with the magnetic member 62B as illustrated in FIG. 4, the plurality of iron core portions 82 are positioned in the vicinity of the end surfaces on the one axial end side of the inner ring 14 and the outer ring 16 as illustrated in FIG. 7. As a result, not only the magnetic member 62B but also the end surface on the one end side of each of the inner ring 14 and the outer ring 16 may be magnetized. When the inner ring 14 and the outer ring 16 are magnetized, the detection accuracy of the rotation speed of the wheel may be affected. In Step S6, it is possible to improve the detection accuracy of the rotation speed of the wheel by removing the magnetism of the inner ring 14 and the outer ring 16.

Step S6 (see FIG. 4) may be omitted when the hub unit 10 is manufactured. Specifically, Step S6 may be omitted when the extent of the magnetism measured at the end surfaces on the one end side of the inner ring 14 and the outer ring 16 after the magnetic member 62B is magnetized in Step S5 is equal to or less than a predetermined allowable value. For example, a lower limit value of magnetism which can be removed in the demagnetization method described above can be used as the predetermined allowable value.

In the method for manufacturing the hub unit 10 according to the embodiment, the magnetic seal member 62 including the seal member 22A and the magnetic member 62B is fixed to the hub unit intermediate 60 including the inner shaft 61 on which the plurality of splines 26 are not formed. In the hub unit intermediate 60 to which the magnetic seal member 62 has been fixed, the plurality of splines 26 are formed on the inner circumferential surface of the main body 611 by cutting the inner circumferential surface of the main body 611. Then, the magnetic member 62B is magnetized.

That is, when the inner circumferential surface of the main body 611 is cut, the magnetic member 62B of the magnetic seal member 62 is not magnetized. It is possible to prevent a metal piece generated by cutting the inner circumferential surface of the main body 611 from sticking to the magnetic member 62B due to a magnetic force. Since the metal piece does not stick to the magnetic member 62B due to the magnetic force, scratches on the magnetic member 62B due to the metal piece can be prevented. As a result, since the pulsar ring 22B can generate a magnetic field without being affected by the metal piece or the scratch, the detection accuracy of the rotation speed of the wheel can be improved.

In the method for manufacturing the hub unit 10 according to the embodiment, the plurality of splines 26 are formed by cutting the inner circumferential surface of the main body 611 of the hub unit intermediate 60. The hub unit intermediate 60 has a configuration obtained by removing the magnetic encoder 22 from the hub unit 10. Since the plurality of splines 26 are formed after the small diameter portion 12D of the inner shaft 12 is press-fitted into the inner ring 14, it is possible to prevent the plurality of splines 26 from being deformed by assembling the hub unit intermediate 60. Therefore, in the hub unit 10 manufactured by the manufacturing method described above, it is possible to improve the forming accuracy of the plurality of splines 26.

When the plurality of splines 26 are formed on the inner circumferential surface of the main body 611 included in the hub unit intermediate 60, the spaces between the outer ring 16 and the inner shaft 12 and between the outer ring 16 and the inner ring 14 are sealed by the seal member 24 and the magnetic seal member 62. Therefore, it is possible to prevent metal pieces generated in forming the plurality of splines 26 from entering the spaces between the outer ring 16 and the inner shaft 12 and between the outer ring 16 and the inner ring 14, and it is possible to prevent the metal pieces from scratching the surfaces of the plurality of rolling elements 18A and the plurality of rolling elements 18B.

In the method for manufacturing the hub unit 10 according to the embodiment, the magnetic member 62B is magnetized after the plurality of splines are formed on the inner circumferential surface of the main body 611. Therefore, the detection accuracy of the rotation speed of the wheel can be improved. Hereinafter, it will be described in detail.

When the magnetic encoder 22 including the pulsar ring 22B is press-fitted to a portion between the cylindrical surface 14C of the inner ring 14 and the cylindrical surface 54B of the outer ring 16, the magnetic encoder 22 may be deformed. For example, the magnetic encoder 22 may be deformed into an elliptical shape by press-fitting. In this case, the plurality of magnetic poles in the pulsar ring 22B are arranged in an elliptical shape when viewed from the one end side in the axial direction. The arrangement of the plurality of magnetic poles in the pulsar ring 22B also changes with the deformation of the pulsar ring 22B, and thus the measurement speed of the rotation speed of the wheel is lowered.

However, in the method for manufacturing the hub unit 10 according to the embodiment, the magnetic member 62B is magnetized after the plurality of splines are formed on the inner circumferential surface of the main body 611. The plurality of iron core portions 82 in the magnetizing yoke 81 are arranged in the circumferential direction. Therefore, even when the magnetic member 62B is slightly deformed by press-fitting, magnetic poles are arranged in the circumferential direction in the magnetic member 62B according to the arrangement of the plurality of iron core portions 82.

Even when the magnetic seal member 62 is deformed by press-fitting, it is possible to prevent the arrangement of the magnetic poles transferred to the magnetic member 62B from changing. As a result, the measurement speed of the rotation speed of the wheel can be improved.

Although the embodiment of the invention is described above, the embodiment described above is merely an example for implementing the invention. Therefore, the invention is not limited to the embodiment described above and the embodiment described above can be appropriately modified and implemented without departing from the spirit of the invention.

This application is based on Japanese patent application (Japanese Patent Application No. 2016-181961) filed on Sep. 16, 2016, the contents of which are incorporated herein by reference.

DESCRIPTION OF REFERENCE SIGNS

10: hub unit
12: inner shaft
14: inner ring
16: outer ring
18A, 18B: rolling element
22: magnetic encoder
22B: pulsar ring
24, 22A: seal member
26: spline
60: hub unit intermediate
62: magnetic seal member
62B: magnetic member
81: magnetizing yoke
82: iron core portion

The invention claimed is:
1. A method for manufacturing a hub unit, the method comprising:
   a) providing a hub unit intermediate, the hub unit intermediate including an inner shaft, an inner ring fixed to an axial end of the inner shaft, and an outer ring rotatably arranged with respect to the inner shaft and the inner ring;
   b) providing a magnetic seal member, the magnetic seal member including: (i) a seal member having an annular surface, and (ii) an annular magnetic member arranged on the annular surface and having no magnetic pole;
   c) arranging the magnetic seal member in a gap formed between the inner ring and the outer ring of the hub unit intermediate such that the seal member is coaxial with a central axis of the inner shaft, wherein the annular surface extends in a radial direction perpendicular to an axial direction of the inner shaft;
   d) forming a plurality of splines extending along the axial direction of the inner shaft on an inner circumferential surface of the inner shaft in the hub unit intermediate by cutting the inner circumferential surface of the inner shaft of the hub unit intermediate in which the magnetic seal member has been arranged; and
   e) forming a plurality of magnetic poles in a circumferential direction of the magnetic seal member, wherein the magnetic seal member has been arranged in the gap between the inner ring and the outer ring of the hub unit intermediate, and the plurality of splines has been formed in the hub unit intermediate.

2. The method according to claim 1, further comprising:
   f) removing magnetism remaining in the inner ring and the outer ring after the step e).

3. The method according to claim 1, wherein
in the step e), in a state where a magnetizing yoke having a cylindrical shape is arranged coaxially with the hub unit intermediate, a plurality of iron core portions positioned on an end surface of the magnetizing yoke facing the hub unit intermediate and arranged in the circumferential direction are brought into contact with the magnetic member arranged in the hub unit intermediate.

* * * * *